No. 854,999. PATENTED MAY 28, 1907.
O. GRAUHERING.
SCREW GEAR FOR GUN SIGHT DEVICES, &c.
APPLICATION FILED APR. 9, 1906.

Witnesses
Inventor.
Oskar Grauhering
By Knight Bros.
Attys

UNITED STATES PATENT OFFICE.

OSKAR GRAUHERING, OF ESSEN-RÜTTENSCHEID, GERMANY, ASSIGNOR TO FRIED. KRUPP AKTIENGESELLSCHAFT, OF ESSEN-ON-THE-RUHR, GERMANY.

SCREW-GEAR FOR GUN-SIGHT DEVICES, &c.

No. 854,999.  Specification of Letters Patent.  Patented May 28, 1907.

Application filed April 9, 1906. Serial No. 310,867.

*To all whom it may concern:*

Be it known that I, OSKAR GRAUHERING, a subject of the Emperor of Germany, and a resident of Essen-Rüttenscheid, Germany, have invented certain new and useful Improvements in Screw-Gears for Gun-Sight Devices and the Like, of which the following is a specification.

The present invention relates to adjusting gears, in particular screw gears for gun sight devices and the like, and the object of the invention is to improve such gears.

In the accompanying drawing, the invention is, by way of example, shown applied to a telescope-sighting-attachment provided with a screw-gear for the lateral adjustment of the telescope carrier.

Figure 1:
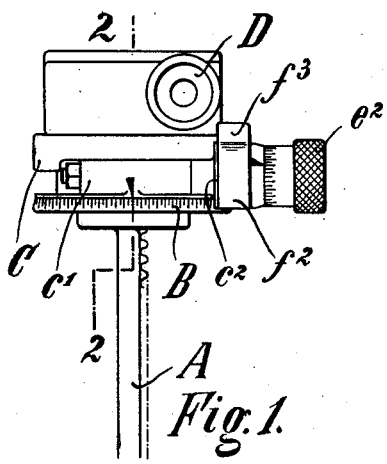
Figure 2:
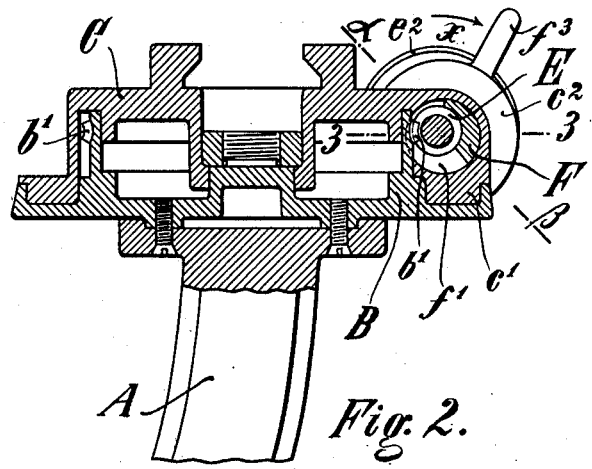
Figure 4:
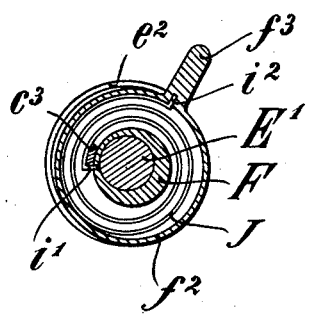
Figure 3:
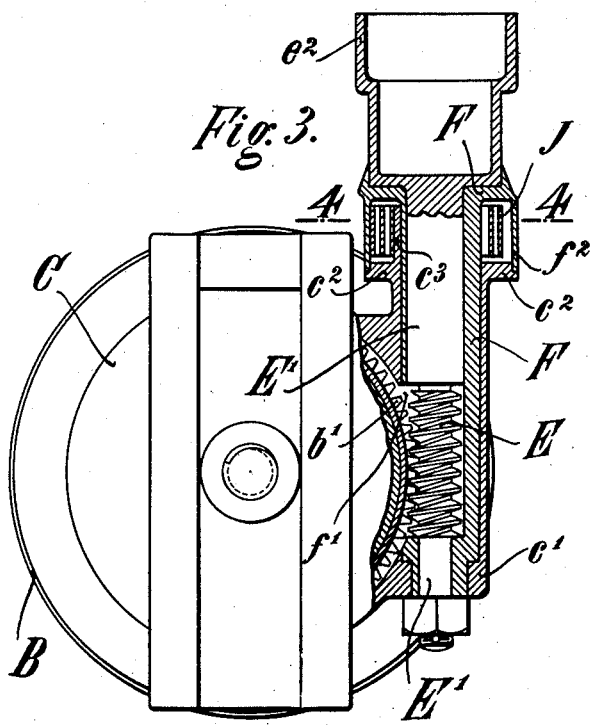
Figure 5:
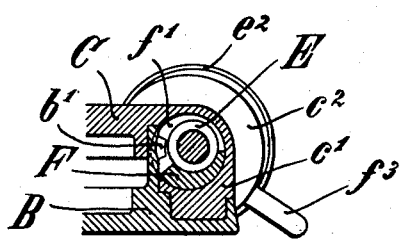

Figure 1 is a rear view of a part of the attachment. Fig. 2 is a section on line 2—2, Fig. 1, looking from the left and with the telescope omitted. Fig. 3 is a top view of Fig. 2, partly in section on line 3—3. Fig. 4 is a section on line 4—4, Fig. 3, looking upwardly, and Fig. 5 is a part of Fig. 2 with changed position of some of the parts. Figs. 2 to 5 are on an enlarged scale.

The top of the attachment bar A is provided with a head B rigidly secured thereto. The carrier C for the sight telescope D (Fig. 1) is rotatably connected with the head B, in such a manner that while the gun remains stationary, the telescope may be directed at any target (auxiliary target) located in the circumference of the gun. The turning of the telescope carrier C is accomplished by means of a screw E journaled in the telescope carrier and engaging with a toothed crown $b^1$ on the head B.

The shaft $E^1$ of the screw E is provided with a hand-wheel $e^2$ and the bearing for the shaft is formed by a sleeve or housing F which is rotatably and non-slidably arranged in a bearing $c^1$ in the telescope carrier C. The sleeve is provided with a cut-away portion $f^1$ (Figs. 2, 3 and 5) for the crown $b^1$. The bores of the bearings in the sleeve F, which are provided for the shaft $E^1$, are located eccentrically to the bores of the bearing $c^1$, in such a manner that the screw E can be brought out of engagement with the teeth $b^1$ (Fig. 5) when the sleeve F is turned approximately 90°. The relative arrangement of the parts is furthermore selected in such a manner that, when the screw E engages with the teeth $b^1$ (Figs. 2 and 3), the plane, which contains the turning axis of the screw E and the turning axis of the sleeve F (which plane is indicated by $\alpha$—$\beta$ in Fig. 2) does not coincide with the plane of the pitch circle of the teeth $b^1$ but is located at an angle of approximately 45° thereto. By reason of this arrangement, the screw E can be brought nearer to the teeth $b^1$ by turning the sleeve F, that is to say, the working positions of the gear can be changed so that there will be no play when the engaging faces of the screw E and of the teeth $b^1$ become worn. The part of the sleeve F which is adjacent to the hand-wheel $e^2$ is of mushroom-shape and forms with a flange $c^2$ of the bearing $c^1$, a housing which is closed on all sides and in which is arranged a spiral spring J. One end $i^1$ (Fig. 4) of the spring J engages with a projection $c^3$ (see also Fig. 3) on the bearing $c^1$ and the other end $i^2$ is secured in the wall $f^2$ of the housing. The spring J tends to hold the sleeve F and the screw E in the position in which the screw engages the teeth $b^1$. A handle $f^3$ on the wall $f^2$ of the housing provides for convenient turning of the sleeve F.

When the parts are in the position most clearly shown in Figs. 2 and 3, in which the screw E engages the teeth $b^1$, the telescope can be adjusted through the medium of the hand-wheel $e^2$. If a considerable angular adjustment is to be imparted to the telescope, the operator turns the handle $f^3$ and the sleeve F against the action of the spring J in the direction of the arrow $x$ (Fig. 2) into the position shown in Fig. 5, in which the screw E is out of engagement with the teeth $b^1$ of the head B, and the telescope may then be roughly adjusted directly by hand. This done, the handle $f^3$ is released and the spring J thereupon returns the screw E into engagement with the teeth $b^1$, whereupon the fine adjustment of the telescope may be effected by turning the hand-wheel $e^2$.

When the engaging faces of the adjusting device E, $b^1$ gradually become worn during the use of the device, the spring J makes up therefor by turning the sleeve F correspondingly in the opposite direction of the arrow $x$, thereby bringing the screw E nearer to the teeth $b^1$. The above-described construction, therefore, provides for a continuous working of the gear without play and consequently provides for an exact adjustment of the telescope.

The device for disengaging the screw E from the teeth $b^1$ moreover permits a very compact construction of the several parts and provides for a dust-proof casing for the gear E $b^1$ through the medium of the telescope carrier C and the bearing $c^1$ integral with the carrier.

Having described my invention what I claim as new is:—

1. In an adjusting gear, the combination of a gear, a rotatable housing, a second gear member rotatably and eccentrically mounted in the housing, and means automatically returning the second gear to the first named gear when the housing is released.

2. In an adjusting means, the combination of a gear member, a rotatable housing, a second gear member rotatably and eccentrically mounted in the housing, and a spring tending to rotate the housing to keep the second gear member in engagement with the first-named gear member.

3. In an adjusting means, the combination of a gear member, a rotatable housing, a second gear member rotatably and eccentrically mounted in the housing, and a spring tending to rotate the housing to keep the second gear member in engagement with the first-named gear member; the plane passing through the axes of the second gear member and the housing being located at an angle to the plane of the first-named gear member when the gear members are in engagement with each other.

4. In an adjusting means for sight devices, the combination with the attachment bar provided with a fixed gear member and the sight device rotatably mounted on the attachment bar, of a rotatable housing mounted in the sight device and a second gear member rotatably and eccentrically mounted in the housing.

5. In an adjusting means for sight devices, the combination with the attachment bar provided with a fixed gear member and the sight device rotatably mounted on the attachment bar, of a rotatable housing mounted in the sight device and a second gear member rotatably and eccentrically mounted in the housing, and means tending to rotate the housing to hold the second gear member in engagement with the fixed gear member.

6. In an adjusting means for sight devices, the combination with the attachment bar provided with a fixed gear member and the sight device rotatably mounted on the attachment bar, of a housing rotatably mounted in the sight device, a screw eccentrically and rotatably mounted in said housing, and means tending to rotate the housing to hold the screw in engagement with the fixed gear member; the plane passing through the axes of the screw and of the housing being located at an angle to the plane of the gear member when the screw engages with the gear member.

The foregoing specification signed at Düsseldorf, this twenty-sixth day of March, 1906.

OSKAR GRAUHERING.

In presence of —
WILLIAM ESSENWEIN,
CARL GRUNWALD.